(12) United States Patent
DiTullio et al.

(10) Patent No.: US 12,041,291 B2
(45) Date of Patent: Jul. 16, 2024

(54) QR ATTRIBUTION

(71) Applicant: Atmosphere.tv, Austin, TX (US)

(72) Inventors: Jeff DiTullio, Austin, TX (US); Alen Durbuzovic, Austin, TX (US)

(73) Assignee: Atmosphere.tv, Austin, TX (US)

( * ) Notice: Subject to any disclaimer, the term of this patent is extended or adjusted under 35 U.S.C. 154(b) by 5 days.

(21) Appl. No.: 17/952,807

(22) Filed: Sep. 26, 2022

(65) Prior Publication Data

US 2024/0107105 A1    Mar. 28, 2024

(51) Int. Cl.
| | |
|---|---|
| *H04N 21/431* | (2011.01) |
| *G06K 19/06* | (2006.01) |
| *H04N 21/422* | (2011.01) |
| *H04N 21/442* | (2011.01) |

(52) U.S. Cl.
CPC ..... *H04N 21/431* (2013.01); *G06K 19/06112* (2013.01); *H04N 21/422* (2013.01); *H04N 21/442* (2013.01)

(58) Field of Classification Search
CPC .. H04N 21/431; H04N 21/422; H04N 21/442; G06K 19/06112
See application file for complete search history.

(56) References Cited

U.S. PATENT DOCUMENTS

| | | | |
|---|---|---|---|
| 2018/0131976 A1* | 5/2018 | Zabelin | H04N 21/812 |
| 2022/0129652 A1* | 4/2022 | Gowda | G06Q 30/02 |

* cited by examiner

*Primary Examiner* — Sumaiya A Chowdhury (57) ABSTRACT

Systems and methods are disclosed for QR attribution for actionable content including in content streams and displays. In certain embodiments, a method may comprise analyzing viewer interaction with displayed content via a content display service, including identifying user content for display that includes an original scannable indicator, re-rendering the user content to produce re-rendered content including a new scannable indicator, receiving an indicator from a user device that the new scannable indicator has been scanned, logging analytics data based on the indicator, and redirecting the user device based on the original scannable indicator.

20 Claims, 4 Drawing Sheets

QR ATTRIBUTION

SUMMARY

In certain embodiments, a method may comprise analyzing viewer interaction with displayed content via a content display service, including identifying user content for display that includes an original scannable indicator, re-rendering the user content to produce re-rendered content including a new scannable indicator, receiving an indicator from a user device that the new scannable indicator has been scanned, logging analytics data based on the indicator, and redirecting the user device based on the original scannable indicator.

In certain embodiments, a system may comprise a content display system configured to analyze viewer interaction with displayed content, including: identify user content for display that includes an original scannable indicator, re-render the user content to produce re-rendered content including a new scannable indicator, receive an indicator from a user device that the new scannable indicator has been scanned, log analytics data based on the indicator, and redirect the user device based on the original scannable indicator.

In certain embodiments, a memory device may store instructions that, when executed, cause a processor to perform a method comprising: implementing a content display service that analyzes viewer interaction with displayed content, including identifying user content for display that includes an original scannable indicator re-rendering the user content to produce re-rendered content including a new scannable indicator, receiving an indicator from a user device that the new scannable indicator has been scanned, logging analytics data based on the indicator, and redirecting the user device based on the original scannable indicator.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
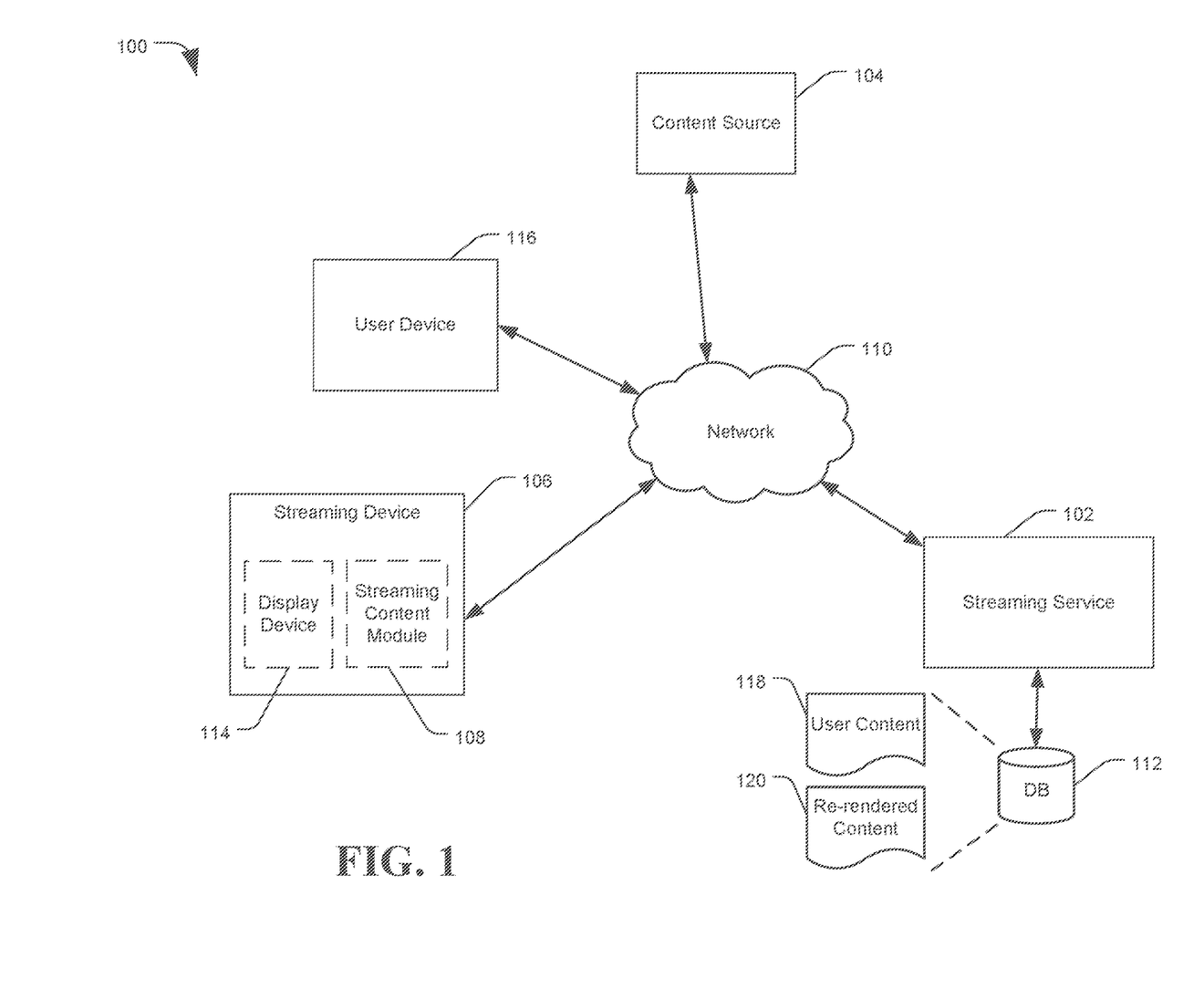
FIG. 1 is a diagram of a system configured to implement QR attribution, in accordance with certain embodiments of the present disclosure.

FIG. 1 depicts a diagram of a system 100 configured to implement quick response (QR) attribution, in accordance with certain embodiments of the present disclosure. In particular, system 100 depicts an example streaming content system, although the present disclosure may apply to any type of digital content display service, including digital advertising signs or billboards, non-streaming (e.g., downloadable) video or image content, or other content display systems. The system 100 may include a streaming service 102, a content source 104, a streaming device 106, a user device 116, and a network 110 over which the components of system 100 may communicate and exchange data. Each or any of streaming service 102, content source 104, streaming device 106, user device 116, and network 110 may be implemented via computers, servers, hardware and software modules, or other system components. Further, streaming service 102 may include or have access to a database (DB) or storage system 112. DB 112 may include one or more data storage devices, data storage mediums, data storage servers, and related data structures, and may store information about streaming device 106 or associated client systems, streaming content data, or other information.

Streaming service 102, sometimes referred to as content display service, may generate, publish, display, or broadcast content to streaming device 106. Some or all of the content, such as video segments or advertisements, may be obtained or transmitted from content source 104 or user device 116. In some embodiments, the streaming service 102 may acquire (e.g., download from, or have uploaded from) content from content source 104 or user device 116, and generate streaming or other visual content to send to streaming device 106 over network 110. In some other embodiments, the streaming service 102 may provide content source 104 with a list or sequence of content elements to include in a content feed, and the streaming content can be provided from content source 104 to streaming device 106 via network 110. User device 116 may upload content to content source 104, which may similarly get added to content streams.

Streaming device 106, such as computers, smartphones, set-top boxes, televisions, or digital signage displays, may receive content such as video feeds or advertising. Streaming device 106 may include a streaming content module 108 and display device 114. Streaming content module 108 may receive content, such as from streaming service 102 or content source 104, via network 110, and perform any data conversion necessary to display the content on display device 114. In some examples, streaming content module 108 may also generate or load content to display with a stream, such as digital signage or ad segments uploaded to streaming device 106 from user device 116. Display device 114 may be a computer, smartphone, or similar device, or simply a display element such as a monitor or television. In some examples, a business may have streaming device 106 set up at a business location or venue for the entertainment of customers or workers. Streaming content may include video segments and advertisements, as well as supplemental overlay data, such as news tickers, sports scores, stock market updates, a listing of current or upcoming video segments, or other data.

A content display service 102 may display content from numerous sources, such as from different content sources 104, user content from multiple different users or client systems 116, or content from streaming service 102 itself. For example, a content stream may include advertising from multiple advertisers, and a variety of actionable content from different users or sources with which viewers can participate, such as quizzes and polls, related video links, or similar content. In some examples, viewer interaction can be accomplished via scannable indicators included in the content, such as quick response (QR) codes including network links to websites or apps with which a viewer can interact. The QR codes in the content may be generated by a user, customer, or entity who created the respective content, and may each direct viewers to different websites or apps.

However, viewer interaction with actionable content, either from the streaming service 102 or uploaded by a user or customer via user device 116, may not currently be tracked or analyzed efficiently, in any aggregated manner. This can present difficulties in determining how many viewers each streaming device 106 or screen is reaching, the effectiveness of different actionable content or advertising campaigns, or other useful metrics.

Accordingly, the system 100 may be configured to implement QR attribution, through a process by which actionable content may be detected and replaced or updated with content that enables usage tracking, before sending traffic to the original destination of the actionable content. Implementing this aggregated or centralized QR tracking and attribution, such as through the streaming service 102, can provide a number of benefits. If the original content creators are not employing analytics or tracking, the analytics data obtained by the streaming service 102 can be provided to them. Even if the content creator or other third party are tracking analytics for their own content, they may be missing useful information, such as a number of times their content was displayed. The streaming service 102 may be able to track a number of times the content was displayed and the number of scans, which can provide a scan-thru rate or interaction rate. The streaming service 102 or content source 104 may also programmatically pull in content or ads from a third party source, which the streaming service 102 may not have a direct relationship with. In this case, while the third party could track interactions on their side, the streaming service 102 could benefit from the analytics data as a measure of the streaming service's performance, even if the data is not shared with the third party.

Actionable content, such as user content 118, may be uploaded or provided to streaming service 102 (e.g., from user device 116 or content source 104), for incorporation into streaming content or otherwise intended for display via streaming device 106. Examples of user content 118 may include digital signage that a customer may upload for display via the streaming device 106 at the customer's own business location, advertising segments intended for display across other venues, or other forms of actionable content. The user content 118 may include scannable indicators, such as QR codes, which viewers can scan with their user devices 116 to be directed to internet resources (e.g., at content source 104) via network 110.

The user content 118 may be received by streaming service 102, and may be stored to a database 112 or other content server. The streaming service 102 may be configured to scan or analyze received user content 118 to detect the presence of scannable indicators, either upon receipt of the content or from scanning content stored to the DB 112. Actionable content within user content 118 may be detected programmatically without manual review, such as based on using computer vision and artificial intelligence (AI) or computer learning routines trained to recognize scannable indicators, or alternately based on content being flagged or designated as actionable content when uploaded, or via manual review and tagging of uploaded content, or via other methods.

When scannable indicators are identified within user content 118, the streaming service 102 may extract original metadata from the scannable indicators, such as an original target network address or link for the actional content, identifiers for a promotional campaign associated with the content, or other metadata details. This metadata may be stored to a database 112, which may associate the user content 118 with its respective scannable indicator metadata. Although the discussion herein focuses on detecting and replacing scannable indicators such as QR codes or bar codes, other types of actionable fields may also be detected and replaced. For example, phone numbers, or text links to video or images could also be identified and replaced.

The streaming service may generate a new scannable indicator (or other actionable content type), which may include new metadata including a new network address or link associated with the streaming service 102. In some embodiments, the new scannable indicator may also include the original metadata, or may include some other identifier which can be used to identify and retrieve the original metadata later. For example, the identifier may be a unique lookup code to access the proper metadata entry in the DB 112, which identifier may be a separate piece of metadata in the new scannable indicator, or incorporated into the new network link. In an example embodiment, the newly generated network link and any other included identifier may be made shorter than the original link, allowing for the creation of a more scannable QR code (e.g., the less data included in a QR code, the larger and more easily scannable the code can be made), while the original destination metadata can be stored server-side. Other potential metadata in the new QR code may include an identifier for a specific streaming device 106 or venue, or other details by which more specific analytics of which streams, screens, venues, or locations receive more user interaction.

The streaming service 102 may then re-render the user content 118, with the new scannable indicator replacing the original scannable indicator, and producing re-rendered content 120. Components of the user content 118 other than the scannable indicator may remain unchanged in the re-rendered content 120, thereby preserving the artistic elements and message of the user content 118. Rather than providing the original user content 118 for display, the streaming service 102 may instead direct that the re-rendered content 120 be provided to streaming device 106 for display.

In some embodiments, the user content 118 may be provided to streaming device 106 unaltered, or with the original scannable indicator content. The streaming device 106, such as via streaming content module 108, may be configured to detect actionable content in the received content, extract the original metadata, generate a new scannable indicator, and overlay the new scannable indicator over the original, or re-render the content with the new indicator. The streaming device 106 may be configured to incorporate metadata such as a streaming device ID, venue or location identification, or other local details into the newly generated QR code. If management of the analytics and attribution of user interactions is handled remotely from the streaming device 106, such as at streaming service 102 and DB 112, the streaming device 106 may incorporate the original link into the new QR code, as the original metadata may not be stored elsewhere for retrieval based on another identifier.

When a user device 116 scans the new scannable indicator of the re-rendered content 120, the new network link may direct the scanning device to an application program interface (API) for the streaming service 102, e.g., by displaying a web link on the user device 116 or directly initiating a network connection. The user device 116 may provide metadata from the new scannable indicator to the API, thereby enabling the API to identify which user content 118 the scan is associated with, and allowing for proper attribution and logging of any scans of displayed content, regardless of its original source. The metadata may also include or identify details such as a venue location, screen ID, or other details which can be used to track how well different streaming devices 106 are reaching viewers. Further, the metadata may enable the API to redirect the user device 116 to the original target link of the original scannable indicator, either based on the original address being included as metadata of the new QR code, or based on an identifier that enables the API to retrieve the original metadata from the DB 112. By redirecting the user device 116 to the original target address, the purposes of the original actionable content can still be executed independent of analytics performed by the streaming service 102. An example implementation of system 100 is discussed in more detail in regard to FIG. 2.

Figure 2:
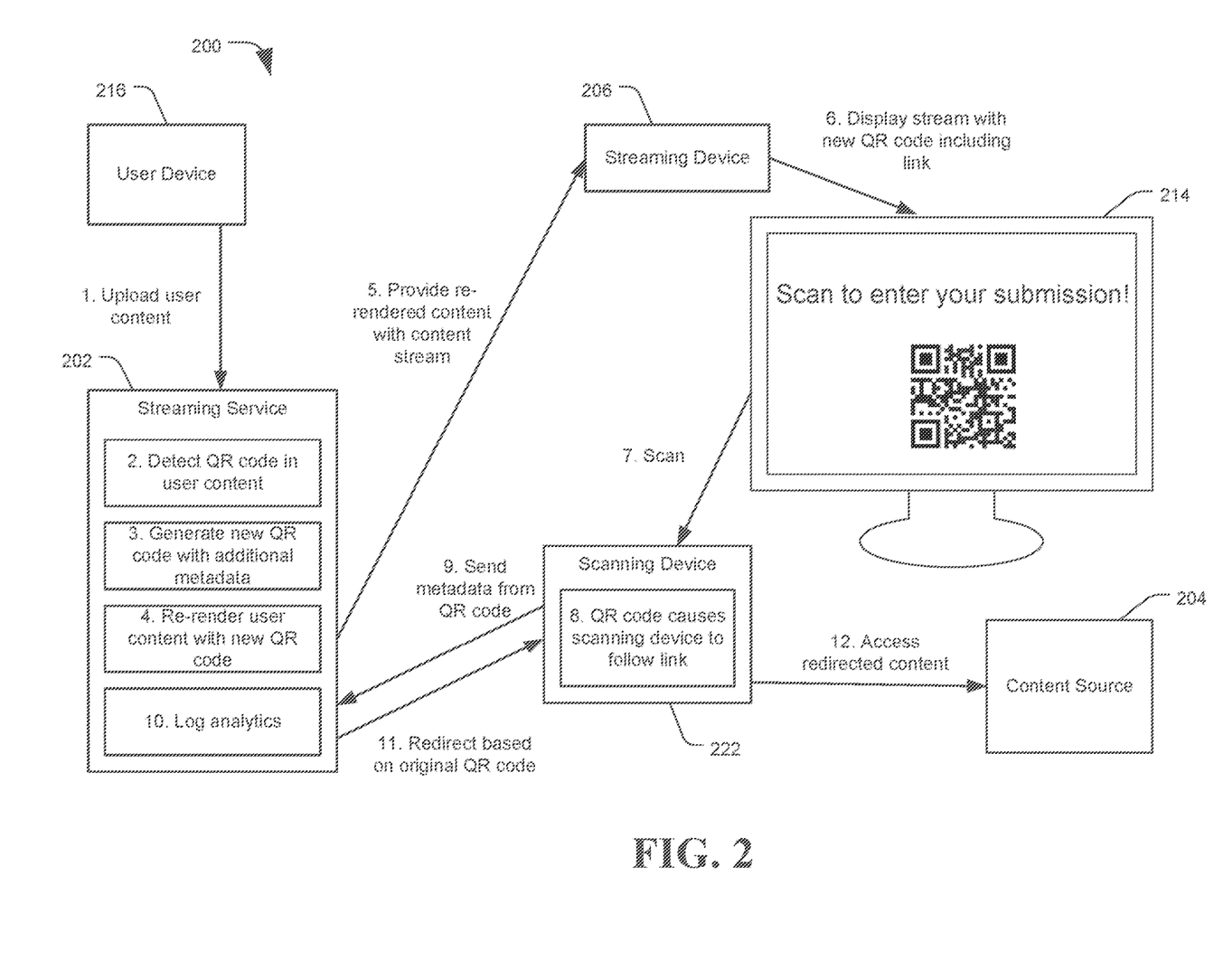
FIG. 2 is a diagram of a system configured to implement QR attribution, in accordance with certain embodiments of the present disclosure.

FIG. 2 depicts a diagram of a system 200 configured to implement QR attribution, in accordance with certain embodiments of the present disclosure. In particular, FIG. 2 presents an example embodiment of a streaming service system configured to detect QR codes in user content, generate replacement QR codes to enable analytics and attribution, and then redirect viewers to the target of the original QR codes. System 200 may include a user device 216, streaming service 202, a streaming device 206, a display device 214, a user scanning device 222, and a content source 204. In some embodiments, the system 200 of FIG. 2 may correspond to the system 100 of FIG. 1.

User device 216 may be a computing device originally used to upload a piece of actionable user content, such as advertising, polls, contests, trivia, or other creative elements that include a scannable indicator, such as a QR code. At step 1, the user device 216 may be used to upload the actionable user content, either to streaming service 202 directly, or to some other content source or clearinghouse from which it may ultimately be accessed by streaming service 202.

The streaming service 202 may analyze or detect a QR code in user content, at step 2. User content without a scannable indicator may be included in a content stream or otherwise set for display via streaming device 206 without modification. When an original QR code is detected within user content, the streaming service may generate a new QR code with new or additional metadata, at step 3. The new QR code may include a new network link to an API for the streaming service, enabling the API to log or perform analytics on actionable content provided through streaming service 202. The new QR code may also include original links or metadata from the original QR code, or an identifier that may be used to retrieve the metadata of the original QR code from a database of the streaming service 202. The user content may be re-rendered to include the new QR code in place of the original QR code, at step 4.

The streaming service 202 may incorporate the re-rendered content into a content stream, such as an HTTP live stream (HLS), or into non-streaming content such as mp4 video files or other video or image formats. The content may be provided to a streaming device 206 for display, at step 5. Content may be provided to streaming device 206 directly from streaming service 202, or through a separate content source 204. Streaming device 206 may be a computing device configured to receive streaming or other visual content over a network, and display the content on a display device 214. The streaming device may include a set-top box or streaming stick, a smartphone, a gaming console, a smart TV, a processing unit of a digital billboard, or any other device capable of the described operations. For example, the streaming device may include an Apple TV® device or a custom Android® device. As previously discussed, in some embodiments the streaming service 202 may provide user content with original QR codes to the streaming device in operation 5, and the streaming device 206 may be configured to perform operations 2, 3, and 4 instead of the streaming service 202. Streaming device 206 may display the content stream, including the re-rendered content with the new QR code and an associated network link, on display device 214 at step 6.

At step 7, a viewer may use a user device 222 configured for recognizing and interpreting scannable indicators, such as a smartphone or tablet, to scan the QR code. The scanning device 222 may interpret the QR code to extract the included metadata, such as a new network link, as well as a network link from the original QR code uploaded by the user, or an identifier that may be used by the streaming service 202 to retrieve any original links or metadata associated with the original QR code.

At step 8, the scanning device 222 may automatically follow the included new network link by, e.g., opening a web browser and navigating to the link, or the device 222 may generate a clickable link that the user can interact with to follow the link. The network link may direct the scanning device 222 to an API hosted by or associated with streaming service 202. The scanning device may provide an indicator that the new QR code has been scanned, including metadata extracted from the QR code, to the streaming service 202 (e.g., via the API), at step 9.

The streaming service 202 may log analytics and attribution information based on the received metadata and identifying information for which original user content the scanned QR code is associated with, at step 10. The streaming service 202 may use the received metadata to redirect the scanning device 222 to a network link originally provided with the original QR code, at step 11. The original link may be included with the metadata received from the scanning device 222, or may be retrieved from a database using an identifier in the metadata. The scanning device 222 may access an original target of the original QR code based on the redirection, such as content source 204, at step 12. An example method for implementing QR attribution is discussed in regard to FIG. 3.

Figure 3:
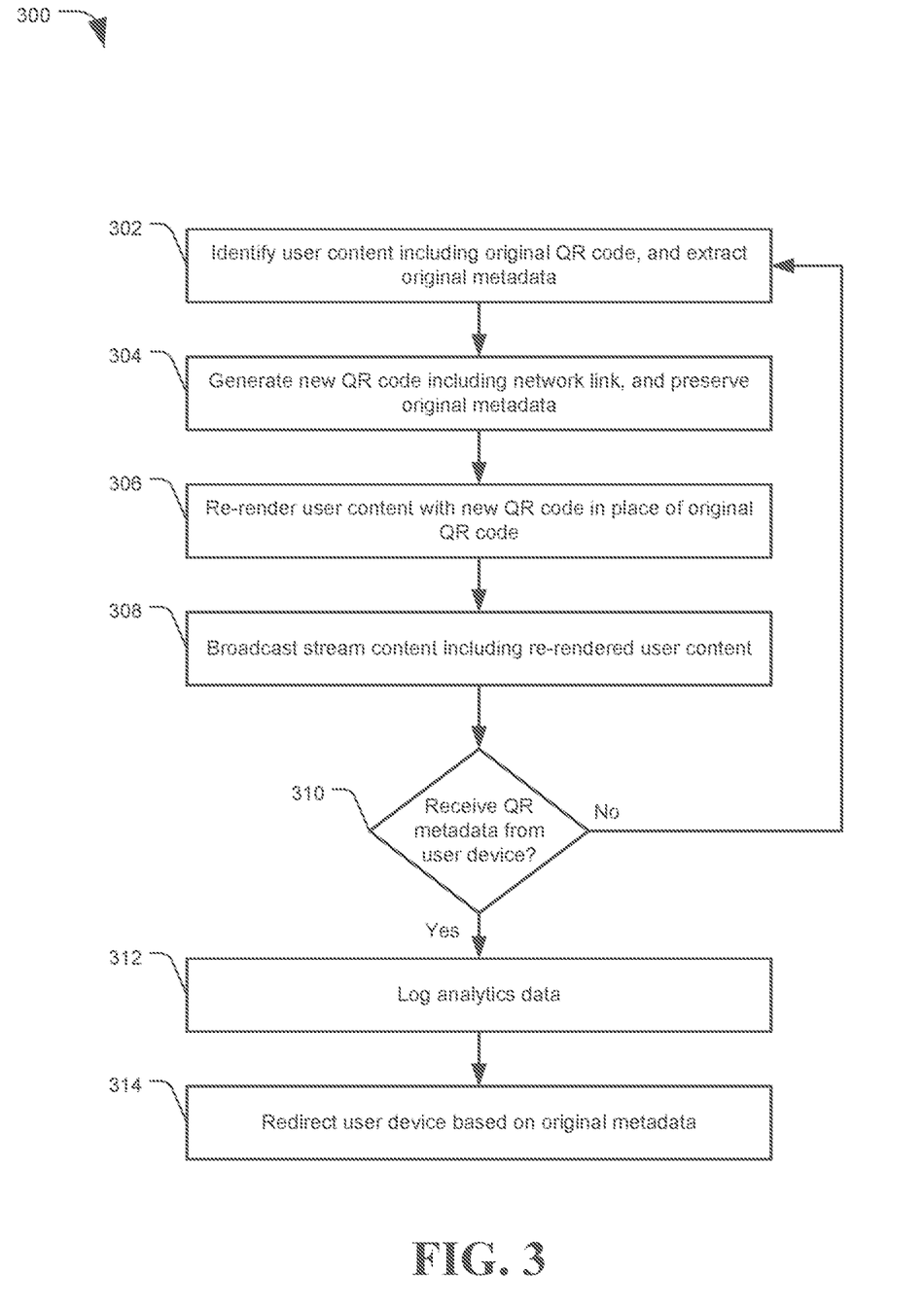
FIG. 3 depicts a flowchart of an example method for implementing QR attribution, in accordance with certain embodiments of the present disclosure.

FIG. 3 depicts a flowchart 300 of an example method for QR attribution, in accordance with certain embodiments of the present disclosure. In particular, the method of FIG. 3 may be a process for tracking actionable content interaction at a streaming service via replacing original QR codes with new QR codes associated with the streaming service. The method of FIG. 3 may be implemented by systems shown in FIG. 1, such as streaming service 102, content source 104, streaming device 106 and streaming content module 108, or some combination thereof, generally collectively referred to as the streaming service 102.

The method may include identifying user content that includes an original QR code or other scannable indicator, and extracting the original metadata from the QR code, at 302. User content including a QR code may be identified using a computer vision algorithm configured to recognize scannable indicators or other actionable content, via identification by users when uploading the content, via manual identification after uploading, or via other processes. The extracted metadata may include an original network link, and potentially other information such as an advertising campaign identifier. The extracted original metadata may be stored to a database or otherwise retained for later access and redirecting scanning user devices.

At 302, the method may include generating a new QR code including a new network link, and providing a way to associate scans of the new QR code with the metadata from the original QR code. For example, the metadata from the original QR can be included as metadata of the new QR code, or the new QR code can include an identifier that may be used to access or retrieve the metadata of the original QR code.

The method may include re-rendering the user content with the new QR code in place of the original QR code, at 306. The new QR code may be overlayed on top of, or otherwise replace, the original QR code in the user content. In some examples, the new QR more may be made more scannable by generating it with more color contrast, making it bigger on screen, or using a smaller link than that original so that the QR code is encoded with less data. The re-rendered user content may then be broadcast to a streaming device for display, which may include incorporating the re-rendered content into a streaming data file or other data display rotation, at 308. In some embodiments, detecting the original QR code, generating the new QR code, re-rendering the content, or some combination may be performed at the streaming device, and the method may include presenting the re-rendered user content at a display device via the streaming device, at 308.

A determination may be made, at 310, whether QR data has been received from a user device, such as by an API of a streaming service being accessed by a smartphone that scanned the QR code from the re-rendered user content. If not, the method may include continuing to evaluate new user content for QR codes and generating replacement QR codes for display, starting at 302. If QR metadata has been received, at 310, the method may include logging analytics data, at 312. The metadata provided by the user device may include an identifier that can associate the scan with the original user content, such as by including the original metadata, or using the received metadata to lookup the original QR code metadata in a database. By identifying the original user content or the uploading source, the scan by the user device can be attributed to the proper customer content or uploading user. Further, user interactions from with content from multiple users or sources can be aggregated by way of having user interactions rerouted through the streaming service. The method may include redirecting the user device based on the original metadata, including directing the user device to a network address included in the original QR code, at 314.

Figure 4:
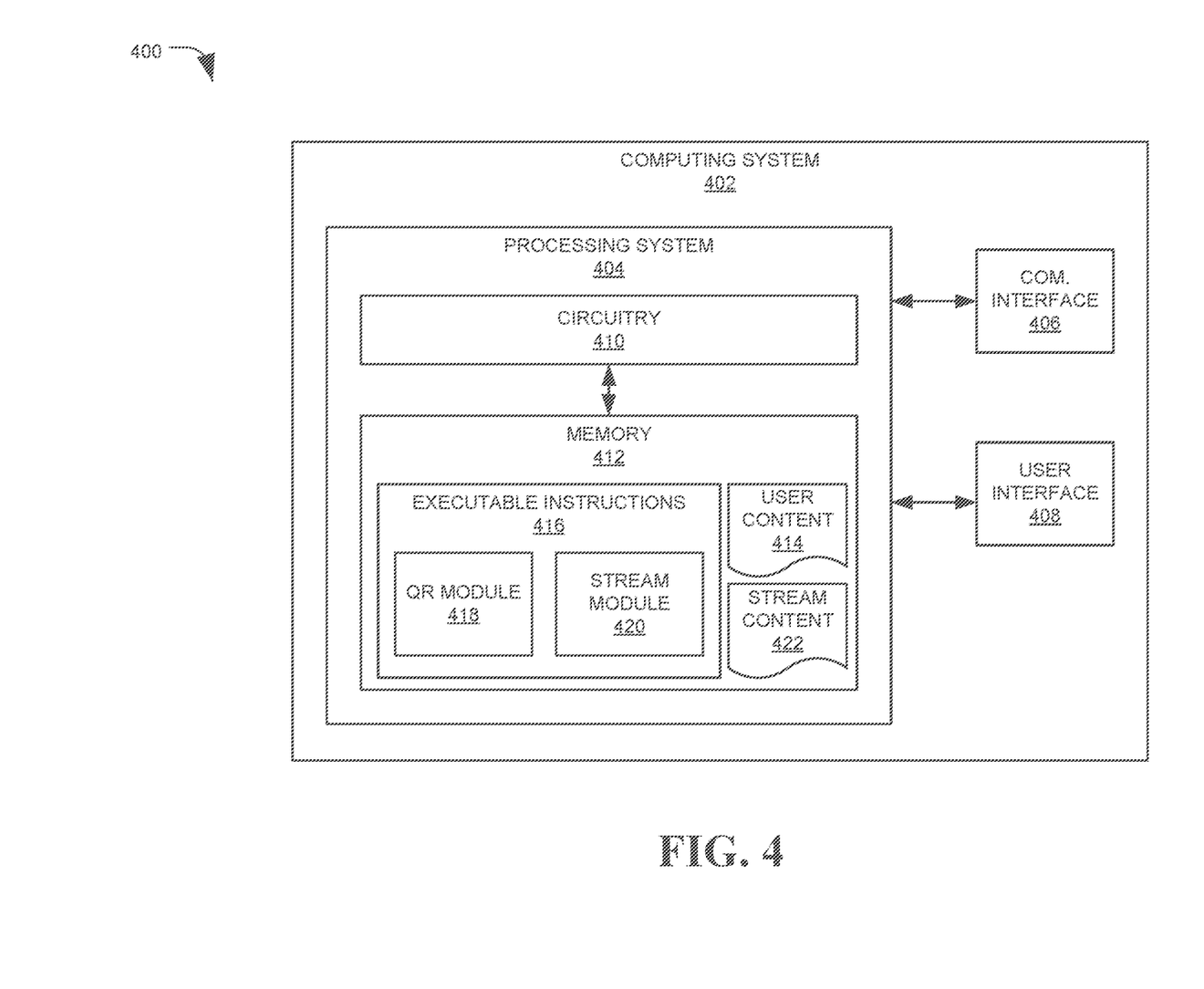
FIG. 4 is a diagram of a system configured to implement QR attribution, in accordance with certain embodiments of the present disclosure.

FIG. 4 is a diagram of a system 400 configured to implement QR attribution, in accordance with certain embodiments of the present disclosure. In particular, FIG. 4 depicts a computer system 402, which may be an example of any computing system that may be employed to perform the operations of streaming service 102, content source 104, streaming device 106 or streaming content module 108, user device 116, and related processes and methods. Computing system 402 may include a processing system 404, a communication interface 406, and a user interface 408. Computing system 402 may include other components, such as a battery and enclosure, that are not shown for clarity. Computing system 402 may comprise one or more server computing systems, desktop computing systems, laptop computing systems, smartphone devices, set-top or streaming boxes, connected televisions, or any other computing system, including combinations thereof.

Communication interface 406 may comprise components that communicate over communication links, such as network cards, ports, radio frequency (RF), processing circuitry and software, or other communication components. Communication interface 406 may be configured to communicate over metallic, wireless, or optical links.

Communication interface 406 may be configured to use Time Division Multiplex (TDM), Internet Protocol (IP), Ethernet, optical networking, wireless protocols, communication signaling, other communication formats, or any combinations thereof. In particular, communication interface 406 may be configured to communicate over a network 110 with streaming service 102, streaming device 106, content source 104, user device 116, or other external systems. Communication interface 406 may also enable communication with local external devices, such as external storage or interface devices (e.g., database 112).

User interface 408 may comprise components that interact with a user to receive user inputs and to present media or other information. User interface 408 may include a display screen, touch screen, touch pad, keyboard, buttons, speaker, microphone, pointer device or interface, communication port, other user input/output apparatus, or any combination thereof. User interface 408 may also include camera or image capture apparatus for scanning elements such as QR codes. In some examples, user interface 408 may be a module configured to interface with a separate system for presenting information and receiving inputs. For example, computing system 402 may have limited or no direct user input components, but it connects (e.g., via communication interface 406) to a monitor or other device that may receive inputs via touch screen, remote control, or other input method, which inputs are then provided or relayed to computing system 402.

Processing system 404 may be linked to communication interface 406 and user interface 408. Processing system 404 can include processing circuitry 410 and memory device 412. Memory device 412 can store executable instructions or other operating software 416, as well as non-executable data files, such as user content 414, and stream content 422. User content 414 may include content uploaded by users or customers of the streaming service (e.g., via communication interface 406), which may include both actionable content including QR codes, and non-actionable content. The streaming service may scan user content 414 for elements including QR codes, extract the information from the QR codes, generate new QR codes, and re-render the user content with the new QR codes for analytics and attribution. The metadata extracted from user QR codes may also be stored in user content 414, for use in generating the new QR codes, looking up original network links for redirection, and for attribution of user interactions to the original user content source. Stream content 422 may include video, audio, advertising, or other content of a content stream, which may be provided from streaming service 102 or content source 104 to streaming device 106. The stream content 422 may include re-rendered user content with the newly generated QR code, which may be displayed via streaming devices 106 in lieu of the original user content 414.

Processing circuitry 410 may comprise a microprocessor and other circuitry that can retrieve and execute instructions 416 from memory device 412. Memory 412 may comprise a non-volatile data storage medium, such as a disk drive or solid state drive, or volatile memory such as random access memories (RAM) and dynamic RAM (DRAM), or any other memory apparatus. In some examples, processing circuitry 410 may be mounted on a circuit board that may also hold memory device 412 and portions of communication interface 406 or user interface 408.

Executable instructions 416 may comprise computer programs, firmware, or some other form of machine-readable processing instructions. Executable instructions 416 may include QR module 418, and stream module 420, although related operations may be handled by multiple different modules or programs (potentially located on multiple computing devices), all operations may be performed by a single module, or additional modules may be included in executable instructions 416. For example, elements or aspects of QR module 418 and stream module 420 may be implemented by streaming service 102, streaming device 106 or streaming content module 108, content source 104, other systems, or a combination thereof. Executable instructions 416 may further include an operating system, utilities, drivers, network interfaces, applications, or other types of software. When executed by processing circuitry 410, executable instructions 416 may direct processing system 404 to operate computing system 402 as described herein.

QR module 418 may be a set of instructions for detecting QR codes in user content 414, extracting information from QR codes, generating new QR codes, re-rendering user content with the new QR codes, or any other operations regarding QR code use and management. In some examples, QR module 418 may also store metadata extracted from original QR codes, and retrieve the original metadata for use in generating new QR codes, attributing scans to user content 414, and redirecting scanning user devices to an original target address of the original QR codes. For example, QR module 418 may interact with a streaming service API to determine whether a user device has scanned a QR code and used it to connect to the API.

Stream module 420 may include a set of computer functions or instructions for transmitting or receiving stream content 422. Stream module 420 may be responsible for encoding or decoding content from a first format (e.g., a video content format) into packets for transmission over a network 110 via communication interface 406. Stream module 420 may store stream content 422, extract and interpret metadata or instructions received with stream content 422, or perform other operations for consolidating and displaying content. In some examples, stream module 420 may coordinate with QR module 418 for re-encoding or re-rendering user content with the new QR codes and inserting it into content streams 422.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
analyzing viewer interaction with displayed content via a content display service, including:
identifying user content for display that includes an original scannable indicator;
re-rendering the user content to produce re-rendered content in order to replace the original scannable indicator with a new scannable indicator;
receiving an indication from a user device that the new scannable indicator has been scanned;
logging analytics data based on the indication; and
redirecting the user device based on the original scannable indicator.

2. The method of claim 1 further comprising:
extracting original metadata, including an original network link, from the original scannable indicator;
generating the new scannable indicator including a new network link; and
redirecting based on the original network link.

3. The method of claim 2 further comprising:
the original network link directs to a first network location associated with a user that uploaded the user content; and
the new network link directs to a second network location associated with the content display service.

4. The method of claim 1 further comprising:
receiving the indication via an API of the content display service.

5. The method of claim 4 further comprising:
generating the new scannable indicator to include an identifier associated with the original scannable indicator; and
directing the user device, via the new scannable indicator, to send the indication to the API along with the identifier.

6. The method of claim 5 further comprising:
the identifier includes an original network link from the original scannable indicator; and
redirecting the user device, via the API, to access the original network link.

7. The method of claim 5 further comprising:
obtaining, at the content display service, an original network link from the original scannable indicator;

storing the original network link to be accessible based on the identifier;

accessing the original network link via the identifier at the API; and redirecting the user device, via the API, to access the original network link.

8. A system comprising:

a content display system configured to analyze viewer interaction with displayed content, including:

identify user content for display that includes an original scannable indicator;

re-render the user content to produce re-rendered content in order to replace the original scannable indicator with a new scannable indicator;

receive an indication from a user device that the new scannable indicator has been scanned;

log analytics data based on the indication; and redirect the user device based on the original scannable indicator.

9. The system of claim 8 comprising the content display system further configured to:

extract original metadata, including an original network link, from the original scannable indicator;

generate the new scannable indicator including a new network link; and redirect based on the original network link.

10. The system of claim 9 further comprising:

the original network link directs to a first network location associated with a user that uploaded the user content; and the new network link directs to a second network location associated with the content display service.

11. The system of claim 8 comprising the content display system further configured to receive the indication via an API of the content display system.

12. The system of claim 8 comprising the content display system further configured to:

generate the new scannable indicator to include an identifier associated with the original scannable indicator; and direct the user device, via the new scannable indicator, to send the indication to the content display system along with the identifier.

13. The system of claim 12 further comprising:

the identifier includes an original network link from the original scannable indicator; and the content display system is further configured to redirect the user device to access the original network link.

14. The system of claim 12 comprising the content display system further configured to:

obtain an original network link from the original scannable indicator;

store the original network link to be accessible based on the identifier;

access the original network link via the identifier in response to receiving the indicator from the user device; and redirect the user device to access the original network link.

15. A memory device storing instructions that, when executed, cause a processor to perform a method comprising:

implementing a content display service that analyzes viewer interaction with displayed content, including:

identifying user content for display that includes an original scannable indicator;

re-rendering the user content to produce re-rendered content in order to replace the original scannable indicator with a new scannable indicator;

receiving an indication from a user device that the new scannable indicator has been scanned;

logging analytics data based on the indication; and redirecting the user device based on the original scannable indicator.

16. The memory device of claim 15 storing instructions that, when executed, cause the processor to perform the method further comprising:

extracting original metadata, including an original network link, from the original scannable indicator;

generating the new scannable indicator including a new network link; and redirecting based on the original network link.

17. The memory device of claim 16 storing instructions that, when executed, cause the processor to perform the method further comprising:

the original network link directs to a first network location associated with a user that uploaded the user content; and the new network link directs to a second network location associated with the content display service.

18. The memory device of claim 17 storing instructions that, when executed, cause the processor to perform the method further comprising:

receiving the indication via an API of the content display service;

generating the new scannable indicator to include an identifier associated with the original scannable indicator; and directing the user device, via the new scannable indicator, to send the indication to the API along with the identifier.

19. The memory device of claim 18 storing instructions that, when executed, cause the processor to perform the method further comprising:

the identifier includes the original network link from the original scannable indicator; and redirecting the user device, via the API, to access the original network link.

20. The memory device of claim 18 storing instructions that, when executed, cause the processor to perform the method further comprising:

storing the original network link to be accessible based on the identifier;

accessing the original network link via the identifier at the API in response to receiving the indication from the user device; and redirecting the user device, via the API, to access the original network link.

* * * * *